(Model.)

D. A. SPRINKLE.
WOOD SPLIT PULLEY.

No. 406,067. Patented July 2, 1889.

Witnesses
Arthur W. Orb.
Jos. C. Ringwalt Jr.

Inventor
David A. Sprinkle.
Norris A. Clark,
his Attorney

UNITED STATES PATENT OFFICE.

DAVID A. SPRINKLE, OF PENNSBOROUGH, WEST VIRGINIA.

WOOD SPLIT PULLEY.

SPECIFICATION forming part of Letters Patent No. 406,067, dated July 2, 1889.

Application filed January 17, 1889. Serial No. 296,686. (Model.)

*To all whom it may concern:*

Be it known that I, DAVID A. SPRINKLE, a citizen of the United States, residing at Pennsborough, in the county of Ritchie, State of West Virginia, have invented certain new and useful Improvements in Wood Split Pulleys, of which the following is a specification, reference being had therein to the accompanying drawings, in which—

Figure 1:
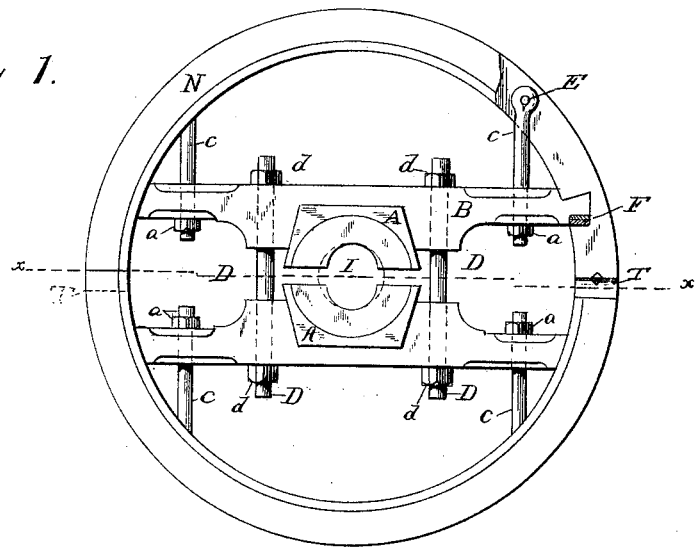
Figure 2:
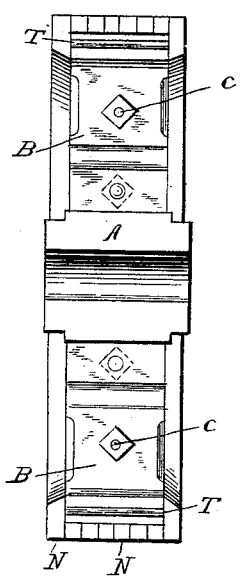
Figure 3:
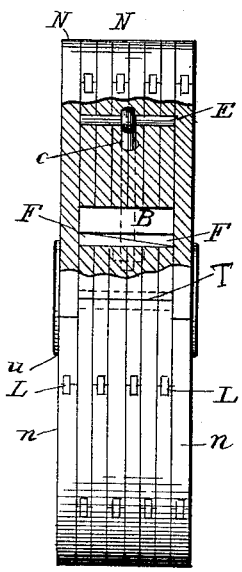

Figure 1 is a side view, parts being broken away, of a pulley embodying my invention; Fig. 2, a view of one half of the pulley, about on the line x x of Fig. 1; Fig. 3, an edge view, parts being broken away, of the pulley.

My invention relates to improvements in wood split pulleys in which the rings composing the rim of the pulley are joined together at the ends by dowel-blocks. The rim, consisting of two parts, is joined together when put upon the shaft at two places T T, diametrically opposite each other, by a compound tongue and groove, and the pulley-sections are held firmly in place by bolts passing through and from arm to arm. The arms, two in number, are exactly alike and parallel to each other, one in each section of the pulley, and fastened in the rim of the pulley by dovetail tenons on the ends of the arms, the tenons being dovetailed on one side only, and firmly held in the corresponding cavity in the rim of the pulley by two wedges, one inserted from each side of the rim and held in place by the exterior rings of the rim, which are put on after the wedges have been inserted. There are stay-rods extending through and from each end of the arms to the rim. These rods are made with an eye in one end and a nut upon the other. The end having the eye in it is inserted in the center of the rim from the inside, and is held in the rim by an anchor-bolt passing through the eye and rim of the pulley from side to side. The anchor-bolts, like the wedges staying the arms in the rim, are held in place by the outer rings, and the other end of stay-rod passes through the arm near the end, and is tightened by a nut. At the middle of each arm is a notch so formed as to make an aperture almost square at the center of the pulley where the arms are put together. The aperture contains a hub made to fit it tightly. The hub, like the pulley, is made in two sections, and in each section is a concave cavity so formed as to make an elliptical aperture in the center thereof.

The improvement consists of the novel features and the peculiar construction and combination of the parts, which will be hereinafter more fully described and claimed.

Similar letters refer to similar parts throughout the several views.

The rim N of the pulley is composed of a plurality of rings n, which are joined at the ends by dowel-blocks L, that pass through the rim from the circumference toward the center of the pulley. The stay-rods C are fastened at their outer ends in the rim N by anchor-bolts E, which pass transversely through the rim and through eyes in the ends of the rods and extend to the arms B, passing through the same, and are tightened by nuts *a a*. The bolts D D, passing through the arms B B, are provided with nuts *d d* to hold the two sections of the pulley together.

B B are the arms, having notches or gains at the center, with sloping sides to receive the halves A, which compose the hub, and are fastened at their ends by dovetail tenons, which are fitted in corresponding cavities in the rim, being more firmly held in place by the stay-rods C and the wedges F, as shown in Figs. 1 and 3.

I is the elliptical aperture formed between the halves of the hub when said halves are separated.

When adjusting the pulley upon a shaft, tightening the bolts D D causes the elliptical aperture in the hub to adhere to the shaft and the pulley to the hub.

I am aware that prior to my invention wood split pulleys have been made with rims composed of rings and hubs fitted in gains in the arms. I do not claim such a combination, broadly; but What I do claim as my invention, and desire to secure by Letters Patent, is—

The herein shown and described pulley, composed of two rim-sections which are joined at their ends by a horizontal and vertical tongue and groove, each rim-section comprising a plurality of rings that are joined at their ends by dowel-blocks, the two arms fastened to the said rim-sections by bolts and dovetail tenons and cavities, said arms having notches midway of their ends with sloping sides, the hub composed of halves, each half fitting in said notches and having sloping sides, and the bolts passing through the said arms for drawing them and the said rim-sections together, substantially as and for the purpose described.

DAVID A. SPRINKLE.

Witnesses:
E. D. CLAYTON,
C. W. WARNER.